(12) United States Patent
Zhou et al.

(10) Patent No.: US 8,446,088 B2
(45) Date of Patent: May 21, 2013

(54) FIELD EMISSION DEVICE FOR EMITTING WHITE LIGHT

(75) Inventors: Mingjie Zhou, Shenzhen (CN); Wenbo Ma, Shenzhen (CN)

(73) Assignee: Ocean's King Lighting Science & Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/514,951

(22) PCT Filed: Dec. 29, 2009

(86) PCT No.: PCT/CN2009/076191
§ 371 (c)(1),
(2), (4) Date: Jun. 8, 2012

(87) PCT Pub. No.: WO2011/079434
PCT Pub. Date: Jul. 7, 2011

(65) Prior Publication Data
US 2012/0248965 A1    Oct. 4, 2012

(51) Int. Cl.
*H01J 63/06* (2006.01)

(52) U.S. Cl.
USPC ........... 313/497; 313/461; 313/309; 313/336; 313/351

(58) Field of Classification Search
None
See application file for complete search history.

(56) References Cited

U.S. PATENT DOCUMENTS 7,399,987 B1 * 7/2008 Viscor et al. .................... 257/10
2009/0009056 A1 * 1/2009 Namba et al. ................. 313/498

* cited by examiner

*Primary Examiner* — Ashok Patel
(74) *Attorney, Agent, or Firm* — Shimokaji & Associates P.C.

(57) ABSTRACT

A field emission device for emitting white light is provided. The device includes a cathode plate assembly (1), an anode plate assembly (2) which is opposite to and spaced from the cathode plate assembly (1), and a supporting body (3) for tight coupling the cathode plate assembly (1) with the anode plate assembly (2). The anode plate assembly (2) includes a transparent substrate (203) which can emit yellow light when excited by blue light. An anode (202) and a blue cathode ray luminescent material layer (201) are provided on the surface of the transparent substrate (203). The blue cathode ray luminescent material layer (201) contains blue cathode ray luminescent material.

15 Claims, 1 Drawing Sheet

FIELD EMISSION DEVICE FOR EMITTING WHITE LIGHT

FIELD OF THE INVENTION

The present invention pertains to microelectronics technical field, relates to a device for emitting white light, and, particularly, to a field emission device for emitting white light based on a field emission apparatus.

BACKGROUND OF THE INVENTION

With the rapid development of illumination technique, it becomes an important project studied in the world nowadays that investigating and developing substitution of traditional light source, i.e., energy saving and environmental protection green light source. And the field emission light source apparatus appeared in vacuum microelectronics field shows a new way to obtain green ecological lighting. The operational principle of the field emission light source apparatus is: in the vacuum circumstance, an anode may be applied a positive voltage to field emissive cathode arrays (field emissive arrays, FEAs) to form an accelerating field, the electron emitted by the cathode is accelerated toward the illuminescent material of the anode plate to emit light. This kind of apparatus has a wide range of working temperature (−40° C.~80° C)., a short response time (<1 ms), and a simple structure. This kind of apparatus saves energy and satisfy the demand of green environmental protection. In comparison with the traditional fluorescent tube, the field emission light source not only have the energy saving advantage of the fluorescent tube, but it also avoids the disadvantages of the environmental pollution and visual fatigue due to pulse light break-up, etc, brought by fluorescent tube, thus it is a energy saving green light source. In comparison with LED, since filed emission cathode may be made in large area, the field emission source is more advantageous in aspects of high power and large area lighting, and has a probability to be a powerful competitor to LED.

Currently, there is a illumination light source device which uses blue light field emission apparatus to excite yellow fluorescence power to emit white light, the device completely separate the blue emission part from the yellow emission part, and the emission principle of the two parts are completely different, in such kind of device, only a kind of blue light material is irradiated directly by a electron beam, and through using a kind of blue light material with better stability, it may effectively reduce the aging problem of light resource apparatus, such as the offset brought by colour coordinate and decreasing in efficiency of light resource, etc. However, in such kind of device, it needs to spread yellow emission material in transparent epoxy resin to coat on the outside surface of the glass substrate, which increases the manufacture workmanship of light source apparatus, and after being used for a long time, the resin on the outside layer of the light source easily becomes aged, etc

DISCLOSURE OF THE INVENTION

The technical problems which the present invention aimed to solve are the conventional emission device needs to spread yellow emitting material in transparent epoxy resin to coat on the outside surface of glass substrate, which makes the manufacture process of light source apparatus complex, and the resin on the outside layer of the light source easily becomes aged and has poor stability after being used for a long time, etc. The present invention provides a field emission device for emitting white light which will reduce the manufacture process of light source apparatus greatly, and improve the stability of the overall apparatus greatly.

The present invention is to solve such conventional problems with an object to provide a field emission device for emitting white light, comprising a cathode plate assembly, an anode plate assembly which is opposite to and spaced apart from the cathode plate assembly, and a supporting body for tightly engaging the cathode plate assembly to the anode plate assembly, wherein the anode plate assembly comprises a transparent substrate which can emit yellow light on condition of being excited by blue light, an anode and a blue cathode ray luminescent material layer are positioned on the surface of the transparent substrate facing the cathode plate assembly, the blue cathode ray luminescent material layer comprises blue cathode ray luminescent material.

A solution is that a transparent anode and a blue cathode ray luminescent material layer are positioned on the surface of the transparent substrate facing the cathode plate assembly in turn.

Another solution is that a blue cathode ray luminescent material layer and a metal anode are positioned on the surface of the transparent substrate facing the cathode plate assembly in turn.

The transparent substrate is microcrystalline glass which can emit yellow light with emission spectrum wave crest in range of 520~590 nm on condition of absorbing blue light in range of 420~490 nm.

The transparent substrate is YAG microcrystalline glass doped with Ce.

The blue cathode ray luminescent material is blue luminescent material which can emit spectrum with wave crest in range of 420~490 nm on condition of being excited by cathode ray.

Preferably, the blue cathode ray luminescent material is: $Y_2S_iO_5$:Ce、$SrGa_2S_4$:Ce、ZnS:Ag、ZnS:Tm、ZnS:Zn or AlN:Eu;

or $La_{(1-x)}Ga_{(1-y)}Al_yO_3$:xTm, wherein $0<x\leq0.1, 0\leq y\leq1$;

or $La_{(1-x)}Ga_{(1-y)}Al_yO_3$:xTm in which La is partly or completely replaced by Y, Gd, Lu, Sc, wherein $0<x\leq0.1$, $0\leq y\leq1$.

The method of manufacturing YAG microcrystalline glass doped with Ce includes the following steps: using CeO, $SiO_2$, AlO, YtO as main raw material, mix the raw material uniformly and put it into a platinum crucible to process for 5hours with 1500° C.~1650° C., and then performing casting molding, finally, crystallize the molded glass at temperature of 1500° C.~1650° C. under reducing atmosphere, to acquire YAG microcrystalline glass doped with Ce.

The field emission device for emitting white light in the present invention not only includes a conventional cathode plate assembly, but also includes a different anode plate assembly. An anode and a luminescent layer are disposed on the surface of anode plate assembly facing the transparent substrate of the cathode plate assembly. There are two kinds of anodes: the transparent anode and the metal anode, when the transparent anode is chose, the surface of the transparent substrate is firstly stuck with the transparent substrate, then coated with a blue cathode ray luminescent material layer, and when the metal anode is chose, the surface of the transparent substrate is firstly coated with a blue cathode ray luminescent material layer, then coated with the metal anode. The transparent substrate in the present invention is a transparent substrate which can emit yellow light on condition of being excited by blue light When the blue cathode ray luminescent material is excited by cathode ray, the blue cathode ray luminescent material emits blue light which emits the transparent substrate to emit yellow light, and the yellow light combines with the remaining blue light to form white light. By modifying the structure and composition of the luminescent layer of the anode plate assembly of the traditional field emission source, the device in the present invention makes the transparent substrate may be directly manufactured to emit yellow light on condition of being excited by blue light, then the manufacture process of light source apparatus is greatly reduced, and the stability of the overall apparatus is greatly improved.

The blue cathode ray luminescent material layer in the present invention can emit only spectrum with wave crest in range of 420~490 nm on condition of being excited by electron beam; meanwhile, the transparent substrate is microcrystalline glass which can emit yellow light with emission spectrum wave crest in range of 520~590 nm on condition of absorbing blue light in range of 420~490 nm, the yellow light combines with the remaining blue light to form white light.

The transparent substrate in the present invention is microcrystalline glass which can emit yellow light with emission spectrum wave crest in range of 520~590 nm on condition of absorbing blue light in range of 420~490 nm. Specifically, the transparent substrate is YAG microcrystalline glass doped with Ce. There is no need to additionally spread yellow luminescent material in the transparent epoxy resin and then coat it on the outside surface of the glass substrate, so that it reduces the procedure.

The blue cathode ray luminescent material is chose to be blue luminescent material which can emit spectrum with wave crest in range of 420~490 nm, such as $Y_2S_iO_5:Ce$, $SrGa_2S_4:Ce$, ZnS:Ag, ZnS:Tm, ZnS:Zn or AlN:Eu, $La_{(1-x)}Ga_{(1-y)}Al_yO_3:xTm$ (wherein $0<x\leq 0.1$, $0\leq y\leq 1$, additionally, La may be partly or completely replaced by Y, Gd, Lu, Sc) etc, this kind of material has better luminescent capability on condition of being excited by cathode ray.

BRIEF DESCRIPTION OF THE DRAWINGS

Many aspects of the present field emission device for emitting white light can be better understood with reference to the following drawings. The components in the drawings are not necessarily drawn to scale, the emphasis instead being placed upon clearly illustrating the principles of the present field emission device for emitting white light.

DETAILED DESCRIPTION OF THE EMBODIMENTS

Further description would be had from the following embodiments and the accompanying drawings.

All the raw material in the embodiments can be got in commodities sold in the market or manufactured by conventional techniques, thus the methods for manufacturing them are not described in detail herein.

Figure 1:
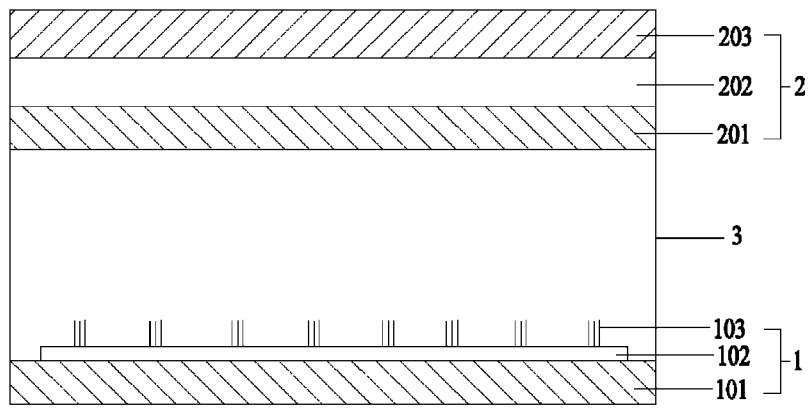
FIG. 1 is a schematic view of a field emission device for emitting white light according to a first exemplary embodiment.
Figure 2:
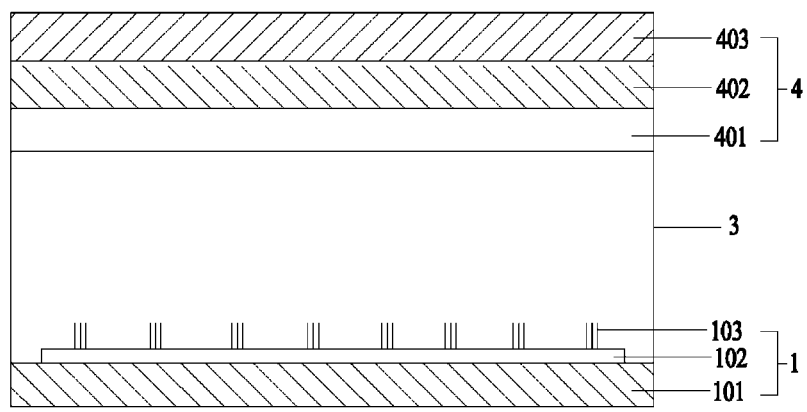
FIG. 2 is a schematic view of a field emission device for emitting white light according to a second exemplary embodiment.

Referring to FIG. 1, a field emission device for emitting white light in accordance with a present first embodiment is illustrated. The field emission device for emitting white light includes a cathode plate assembly 1, an anode plate assembly 2 which is opposite to and spaced apart from the cathode plate assembly, and a supporting body 3 for tightly engaging the cathode plate assembly with the anode plate assembly, wherein the cathode plate assembly 1 includes a cathode plate 101 disposed horizontally, a electric cathode, a grid wire 102, and a electric emission source 103. The electric cathode, the grid wire 102, and the electric emission source 103 are positioned on the upper surface of the cathode plate 101. The anode plate assembly 2 includes a transparent substrate 203, the transparent substrate 203 is YAG microcrystalline glass which can emit yellow light with emission spectrum wave crest in range of 520~590 nm on condition of absorbing blue light in range of 420~490 nm. A transparent anode 202 and a blue cathode ray luminescent material layer are positioned on the surface of the transparent substrate 203 facing the cathode plate 101 from the top down in turn. The transparent anode 202 is made by coating on the transparent substrate 203 with ITO or ZnO as raw material. The process of coating is implemented by using ways of magnetron-sputtering or vacuum evaporating. The blue cathode ray luminescent material layer 201 may emit blue light with wave crest in range of 420~490 nm on condition of being excited by electron beam, the present embodiment may choose cathode ray luminescent material layer with material of ZnS:Ag (ZnS fluorescence material using Ag as activator). The blue cathode ray luminescent material layer 201 is coated on the lower surface of the transparent anode 202 by way of screen printing, the supporting body 3 may space the anode plate assembly 2 apart from the cathode plate assembly 1 by certain distance, and tightly engaging them to form a space whose inside is vacuum, the electric potential difference between the cathode plate 101 and the transparent anode plate 202 can be chosen to be a value in 1~20KV, such as 2, 4, 5, 7, 10, 12, 15, 17, 18, 20KV, etc, more preferably 4~15KV.

The field emission device of the second embodiment is similar to the field emission device of the first embodiment, except for that the field emission device for emitting white light comprising: a cathode plate assembly 1, an anode plate assembly 4 which is opposite to and spaced apart from the cathode plate assembly, and a supporting body 3 for tightly engaging the cathode plate assembly with the anode plate assembly, the structure of the cathode plate assembly 1 is the same with that of the cathode plate assembly in embodiment 1, thus the detail is not repeated.

The anode plate assembly 4 comprises a transparent substrate 403, the transparent substrate 403 is microcrystalline glass which can emit yellow light with emission spectrum wave crest in range of 520~590 nm on condition of absorbing blue light in range of 420~490 nm, a blue cathode ray luminescent material layer 402 (choosing $LaGaO_3:Tm$ as blue cathode ray luminescent material) is coated directly on the lower surface of the transparent substrate 403, then a Al layer is evaporation plated on the blue cathode ray luminescent material layer 402, and the coating way of the blue cathode ray luminescent material layer 402 is the same with that in embodiment 1.

The blue cathode ray luminescent material may further be chosen to be $Y_2SiO_5:Ce$, $SrGa_2S_4:Ce$, ZnS:Ag, ZnS:Tm、$Sr_2CeO_4$, ZnS:Zn, AlN:Eu;
$La_{0.99}Ga_{0.5}Al_{0.5}O_3:0.01Tm$, $La_{0.9}GaO_3:0.1Tm$, $La_{0.98}AlO_3:0.02Tm$,
$La_{0.92}Ga_{0.6}Al_{0.4}O_3:0.08Tm$, $La_{0.6}Y_{0.33}Ga_{0.4}Al_{0.6}O_3:0.07Tm$,
$Gd_{0.96}Ga_{0.35}Al_{0.65}O_3:0.04Tm$, $La_{0.2}Lu_{0.75}Ga_{0.8}Al_{0.2}O_3:0.05Tm$, etc.

Figure 3:
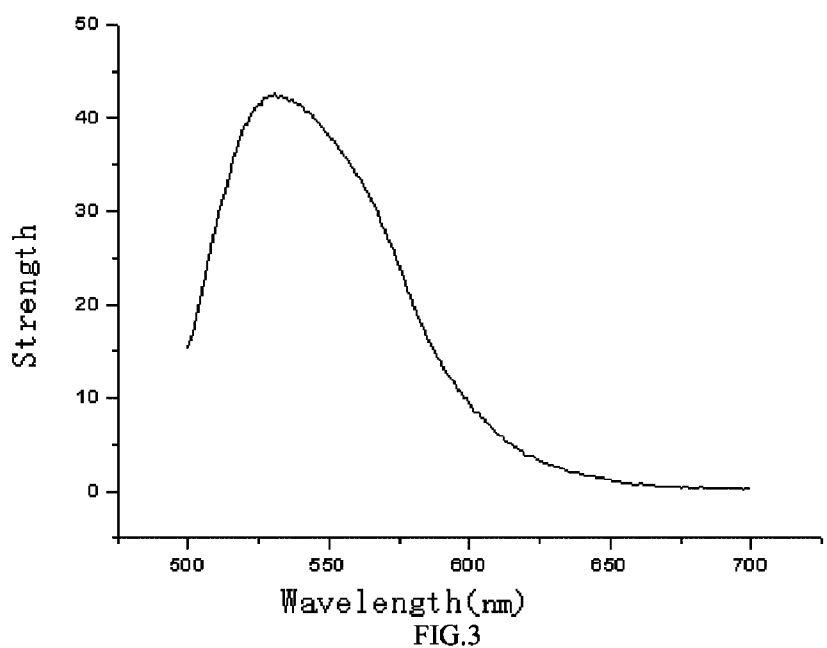
FIG. 3 is the emission spectrum of YAG microcrystalline glass excited by a laser with wavelength of 460 nm.

FIG. 3 shows the emission spectrum of YAG microcrystalline glass on condition of being excited by laser with wavelength of 460 nm. It can be seen from FIG. 3 that YAG microcrystalline glass emits yellow light with wavelength of 530 nm, and the yellow light of the wavelength combines with the blue light to form white light.

What is claimed is:

1. A field emission device for emitting white light comprising:
    a cathode plate assembly;
    an anode plate assembly opposite to and spaced apart from the cathode plate assembly, the anode plate assembly comprising: a transparent substrate emitting yellow light on condition of being excited by blue light, an anode positioned on the surface of the transparent substrate facing the cathode plate assembly; and a blue cathode ray luminescent material layer positioned on the surface of the transparent substrate facing the cathode plate assembly, the blue cathode ray luminescent material layer comprising blue cathode ray luminescent material; and
    a supporting body for tightly engaging the cathode plate assembly to the anode plate assembly.

2. The field emission device for emitting white light as claimed in claim 1, wherein a transparent anode and a blue cathode ray luminescent material layer are positioned on the surface of the transparent substrate facing the cathode plate assembly in turn.

3. The field emission device for emitting white light as claimed in claim 2, wherein the transparent substrate is microcrystalline glass which can emit yellow light with emission spectrum wave crest in range of 520~590 nm on condition of absorbing blue light in range of 420~490 nm.

4. The field emission device for emitting white light as claimed in claim 3, wherein the transparent substrate is YAG microcrystalline glass doped with Ce.

5. The field emission device for emitting white light as claimed in claim 2, wherein the blue cathode ray luminescent material is blue luminescent material which can emit spectrum with wave crest in range of 420~490 nm on condition of being excited by cathode ray.

6. The field emission device for emitting white light as claimed in claim 5, wherein the blue cathode ray luminescent material is:
    $Y_2S_iO_5$:Ce, $SrGa_2S_4$:Ce, ZnS:Ag, ZnS:Tm, ZnS:Zn or AlN:Eu;
    or $La_{(1-x)}Ga_{(1-y)}Al_yO_3$:xTm, wherein $0<x\leq0.1$, $0\leq y\leq 1$;
    or $La_{(1-x)}Ga_{(1-y)}Al_yO_3$:xTm in which La is partly or completely replaced by Y, Gd, Lu, Sc, wherein $0<x\leq0.1$, $0\leq y\leq 1$.

7. The field emission device for emitting white light as claimed in claim 1, wherein a blue cathode ray luminescent material layer and a metal anode are positioned on the surface of the transparent substrate facing the cathode plate assembly in turn.

8. The field emission device for emitting white light as claimed in claim 7, wherein the transparent substrate is microcrystalline glass which can emit yellow light with emission spectrum wave crest in range of 520~590 nm on condition of absorbing blue light in range of 420~490 nm.

9. The field emission device for emitting white light as claimed in claim 8, wherein the transparent substrate is YAG microcrystalline glass doped with Ce.

10. The field emission device for emitting white light as claimed in claim 7, wherein the blue cathode ray luminescent material is blue luminescent material which can emit spectrum with wave crest in range of 420~490 nm on condition of being excited by cathode ray.

11. The field emission device for emitting white light as claimed in claim 10, wherein the blue cathode ray luminescent material is:
    $Y_2S_iO_5$:Ce, $SrGa_2S_4$:Ce, ZnS:Ag, ZnS:Tm, ZnS:Zn or AlN:Eu;
    or $La_{(1-x)}Ga_{(1-y)}Al_yO_3$:xTm, wherein $0<x\leq0.1$, $0\leq y\leq 1$;
    or $La_{(1-x)}Ga_{(1-y)}Al_yO_3$:xTm in which La is partly or completely replaced by Y, Gd, Lu, Sc, wherein $0<x\leq0.1$, $0\leq y\leq 1$.

12. The field emission device for emitting white light as claimed in claim 1, wherein the transparent substrate is microcrystalline glass which can emit yellow light with emission spectrum wave crest in range of 520~590 nm on condition of absorbing blue light in range of 420~490 nm.

13. The field emission device for emitting white light as claimed in claim 12, wherein the transparent substrate is YAG microcrystalline glass doped with Ce.

14. The field emission device for emitting white light as claimed in claim 1, wherein the blue cathode ray luminescent material is blue luminescent material which can emit spectrum with wave crest in range of 420~490 nm on condition of being excited by cathode ray.

15. The field emission device for emitting white light as claimed in claim 14, wherein the blue cathode ray luminescent material is: $Y_2S_iO_5$:Ce, $SrGa_2S_4$:Ce, ZnS:Ag, ZnS:Tm, ZnS:Zn or AlN:Eu;
    or $La_{(1-x)}Ga_{(1-y)}Al_yO_3$:xTm, wherein $0<x\leq0.1$, $0\leq y\leq 1$;
    or $La_{(1-x)}Ga_{(1-y)}Al_yO_3$:xTm in which La is partly or completely replaced by Y, Gd, Lu, Sc, wherein $0<x\leq0.1$, $0\leq y\leq 1$.

* * * * *